United States Patent [19]

Dong

[11] 3,854,711
[45] Dec. 17, 1974

[54] PORTABLE MAGNETIC CHUCK
[76] Inventor: Poy Dong, 70 Louise Rd., Chestnut Hill, Mass. 02135
[22] Filed: June 13, 1972
[21] Appl. No.: 262,299

[52] U.S. Cl. ................................. 269/8, 335/286
[51] Int. Cl. ............................................ B25b 11/00
[58] Field of Search ............... 269/8, 94; 51/216 R; 335/286, 295; 317/157.5 CL

[56] References Cited
UNITED STATES PATENTS

| | | | |
|---|---|---|---|
| 885,949 | 4/1908 | Peirce | 269/94 X |
| 1,301,135 | 4/1919 | Karasick | 335/286 |
| 2,117,132 | 5/1938 | Baermann | 51/216 R |
| 2,286,238 | 6/1942 | Simmons | 335/295 |
| 2,485,220 | 10/1949 | Starn | 335/286 |
| 2,755,758 | 7/1956 | Johansen | 269/94 X |
| 3,336,551 | 8/1967 | Stead | 269/8 X |

FOREIGN PATENTS OR APPLICATIONS
6,502,081  3/1966  Netherlands ........................... 269/8

Primary Examiner—Al Lawrence Smith
Assistant Examiner—James G. Smith
Attorney, Agent, or Firm—Joseph S. Iandiorio

[57] ABSTRACT

A magnetic work holder system including a work holder base adapted to hold a plurality of position blocks for positioning one or more work pieces comprising a laminated work surface formed of alternately arranged magnetic and non-magnetic strips, first and second clamp blocks disposed on opposite sides of the work surface, each of the clamp blocks having engaging means on their inner edge for clamping one or more position blocks disposed between them on the work surface, each of the clamp blocks including fastening means for tightening the clamp blocks down toward the work holder base and means for applying increased clamping force to the position blocks.

3 Claims, 11 Drawing Figures

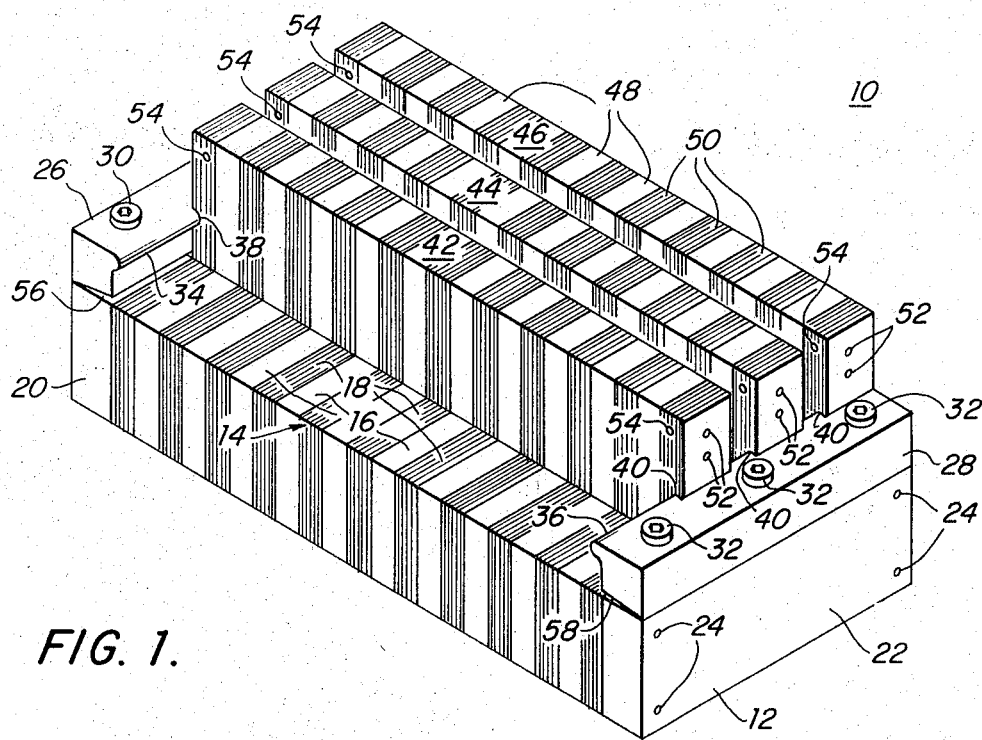
FIG. 1.
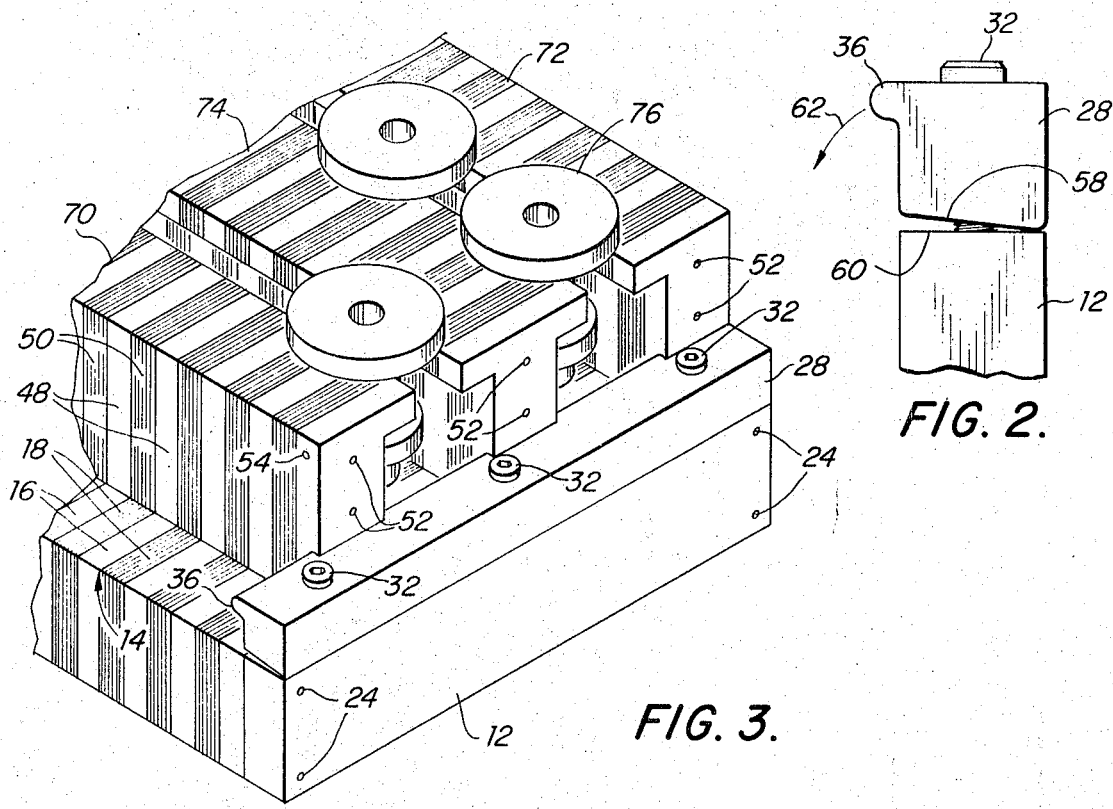
FIG. 2.
FIG. 3.

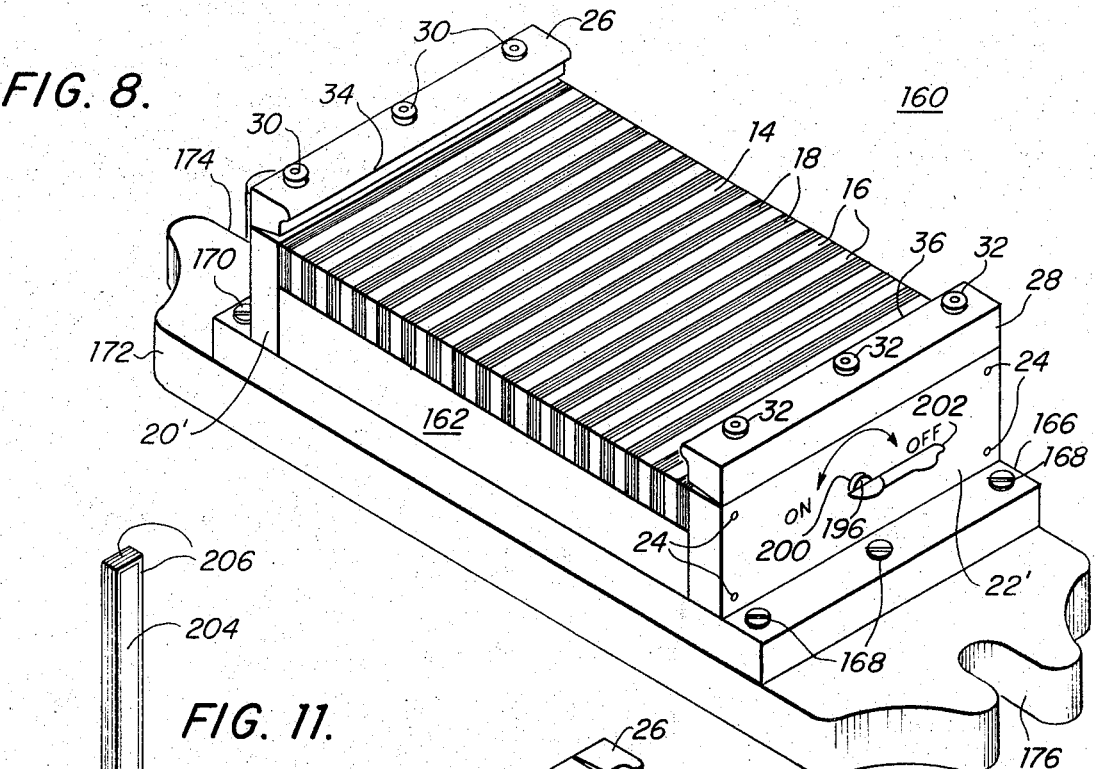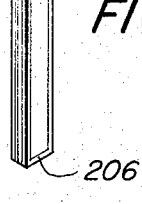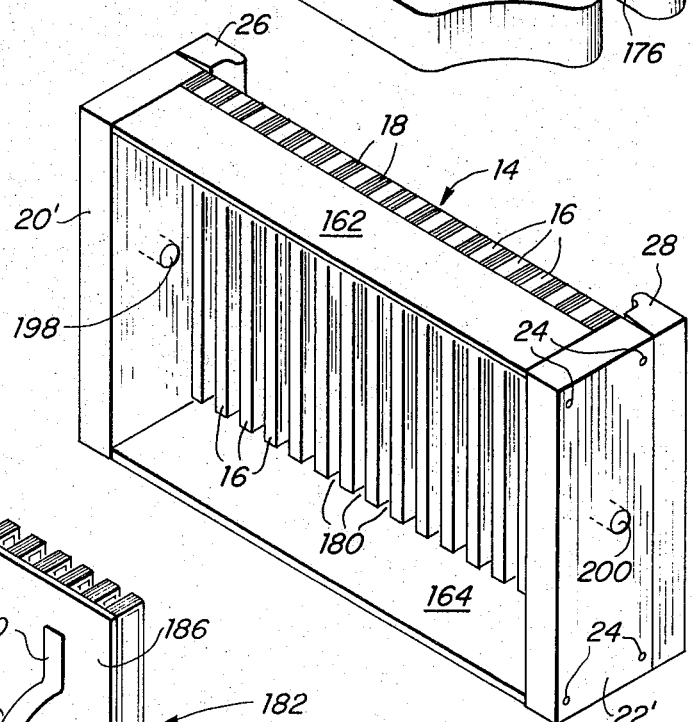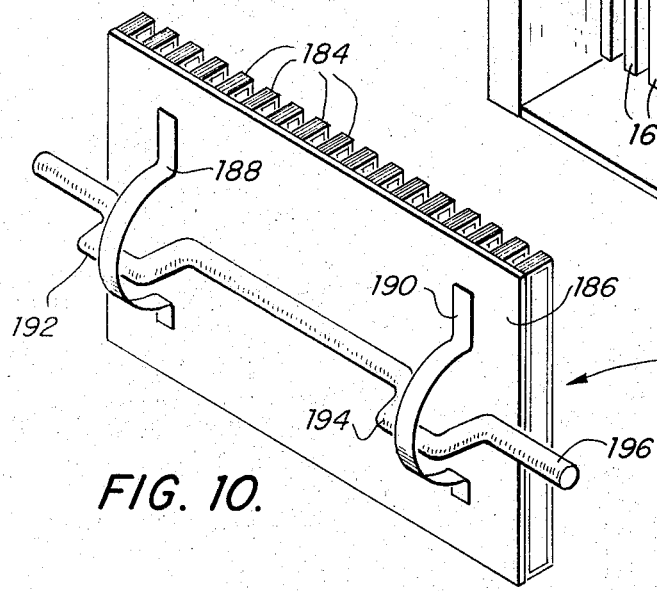

PORTABLE MAGNETIC CHUCK

FIELD OF INVENTION

This invention relates to a magnetic work holder capable of holding a number of work pieces using a plurality of position blocks.

BACKGROUND OF INVENTION

Conventional work holders use a pair of jaws or clamps or position blocks to hold a work piece to be worked on by a machine tool. The holding force to keep the work piece in place may be either mechanical, magnetic or both. As the art has become more sophisticated electromagnets or other sources of magnetic power were built into the machine tool work bed so that work pieces could be held in position by the magnetic power without mechanical clamps. Further improvements provided special position blocks which could be used on the work bed of the machine to aid in properly positioning a work piece having predetermined shapes compatible with the blocks. However these blocks were not always useful because their laminar structure of magnetic and non-magnetic strips did not always match those of the work bed of the machine tool. Still further improvements provided for magnetic work holders which are independent of the machine tool and have a pair of clamping blocks for holding a work piece; the magnetic field may be contained in the work holder itself or the magnetic field provided by the machine tool may be used.

SUMMARY OF INVENTION

It is therefore an object of this invention to provide a new magnetic work holder system, which can hold a number of work pieces using a number of position blocks, which has a laminar work surface and means for securing a plurality of position blocks of like laminar construction on the work surface, and which may have its own self-contained source of magnetic field and yet is also capable of using the magnetic field of the machine tool to maintain itself in position on the work field.

This invention derives from the realization that machine tools, such as milling machines or grinding machines which require work holders, actually have a work area far greater than the area of work provided them by conventional work holders, and by the realization that the productivity of such machines can be increased twofold, fourfold, eightfold or even more, not by extending the length of the jaws, a throwback to the channel of thinking that surrounded mechanical vises, but by adding a new dimension of expansion to work holders, especially magnetic work holders by providing a means for easily receiving, securing and replacing a number of such "jaws" or position blocks on a work holder to suit the particular need of the job.

This is accomplished using a magnetic work holder system including a work holder base adapted to hold a plurality of position blocks for positioning one or more work pieces. The work holder system includes a laminated work surface formed of alternately arranged magnetic and non-magnetic strips and first and second clamping blocks disposed at opposite sides of the work surface. Each of the blocks has engaging means on its inner edges for clamping to one or more position blocks disposed on the work surface. Each of the clamp blocks includes fastening means for tightening the blocks down toward the work holder base and means for applying increased clamping force to the positioning blocks between them.

DISCLOSURE OF PREFERRED EMBODIMENT

Other objects, features and advantages will occur from the following description of a preferred embodiment and the accompanying drawings, in which:

FIG. 1 is an axonometric view of a work holder according to this invention with a plurality of position blocks in place on its working surface.

FIG. 2 is a cross-sectional elevational view of a portion of the work holder shown in FIG. 1 enlarged to show the bevelled lower surface of a clamp block.

FIG. 3 is an axonometric view of a portion of the work holder of FIG. 1 with two L-shaped and one T-shaped position blocks in place on the working surface for positioning a number of specially shaped parts for machining.

FIG. 8 is an axonometric view of a work holder according to this invention similar to that shown in FIG. 1 having a magnetic mounting plate for interaction with a magnetic field provided by the machine tool.

FIG. 9 is an axonometric bottom view of the work holder of FIG. 8 showing the spaces between the magnetic strips that form the laminar work surface.

FIG. 10 is an axonometric bottom view of an array of spaced ceramic magnets mounted on a platform and driven by an actuator to nest in the spaces between the magnetic strips as shown in FIG. 9.

FIG. 11 is a side elevational view of one of the magnets in the magnet array shown in FIG. 10.

Figure 4:
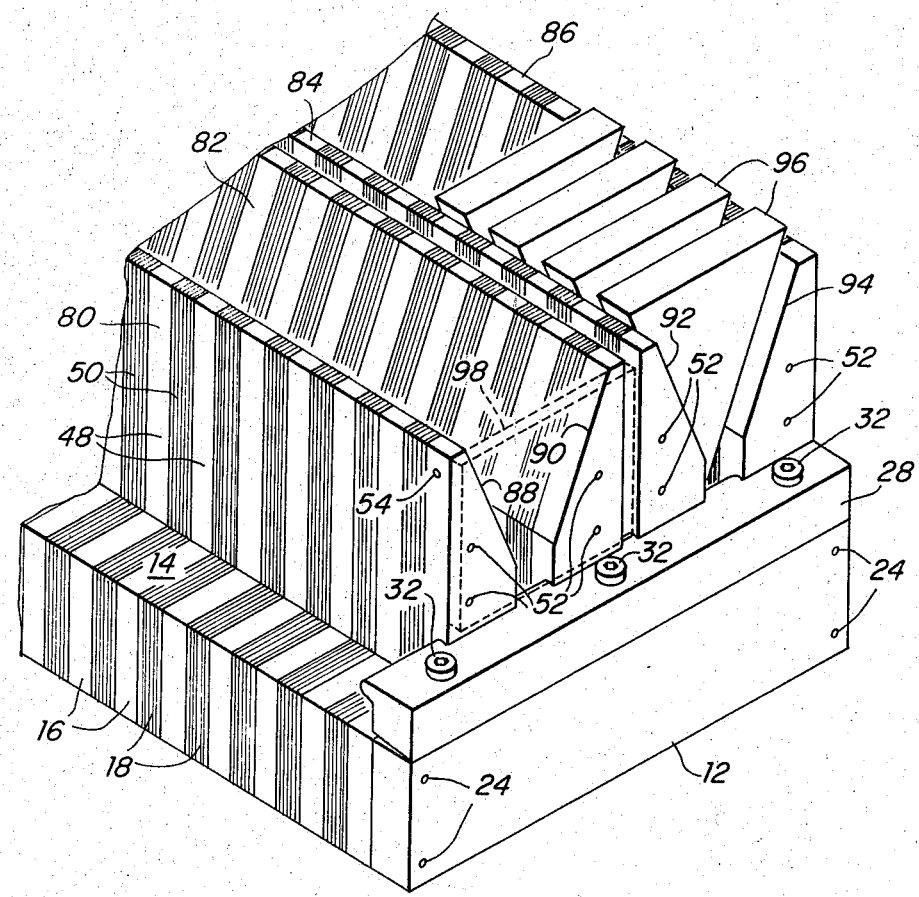
FIG. 4 is an axonometric view of a portion of the work holder of FIG. 1 with four oblique position blocks clamped on the work surface for positioning a number of specially shaped work pieces for machining.

There is shown in FIG. 1 a work holder system 10 according to this invention including a base 12 having a work surface 14 formed of a laminar structure including alternate layers of magnetic 16 and non-magnetic 18 strips of material; magnetic strips 16 may be made of magnetic steel or iron and non-magnetic strips 18 may be made of brass, aluminum or non-magnetic stainless steel. At each end of work surface 14 there is located an anchor block 20, 22 which may be fastened to laminar work surface 14 by means of screws 24 or other fastening devices.

Supported on anchor blocks 20 and 22 are clamp blocks 26 and 28 which are fastened thereto by means of set screws 30 and 32, respectively. Clamp blocks 26 and 28 have a longitudinal bead 34, 36 or similar structure for engaging grooves 38 and 40 at opposite ends of position blocks 42, 44, 46 which are mounted on work surface 14. Position blocks 42, 44, 46 have the same laminar construction as work surface 14 composed of alternate strips of magnetic 48 and non-magnetic 50 strips. Threaded holes 52 may be provided at each end of position blocks 42, 44 and 46 to receive screws which mount assembly brackets and keeper plates as will be discussed infra. Similarly threaded holes 54 may be provided on each side of position blocks 42, 44 and 46 for receiving, for example, a keeper plate when the position blocks contain transverse V-notches as will be explained infra.

When position blocks 42, 44 and 46 are properly located on work surface 14 they are clamped in position with clamp blocks 26 and 28 by means of set screws 30 and 32, respectively. Initially screws 30 and 32 are set loosely enough so that blocks 42, 44 and 46 may be easily slid along work surface 14 with their grooves 38 and 40 engaging longitudinal beads 34 and 36. After position blocks 42, 44 and 46 are in position screws 30 and 32 may be tightened down. Since the lower face 56, 58 of clamp blocks 26 and 28 are bevelled the tightening of screws 30 and 32 causes clamp blocks 26 and 28 to rotate or rock so that beads 34 and 36 move inwardly and downwardly against grooves 38 and 40 and securely clamp position blocks 42, 44 and 46 in position.

The bevelled edge on the clamp block may be seen in more detail in FIG. 2 with respect to clamp block 28 which rests on anchor block 12 whose top surface 60 is flat. The bevelled lower surface 58 of clamp block 28 causes clamp block 28 with bead 36 to rock inwardly and downwardly, as shown by arrow 62, as screws 32 are tightened. Alternatively, the lower surface 58 of clamp block 28 could be made flat and the top surface 60 of anchor block 12 may be bevelled or each of surfaces 58 and 60 may be somewhat bevelled. Or alternative means for causing a rocking motion may be used.

Position blocks 42, 44 and 46 may take a variety of forms as shown in FIGS. 3 through 7 where like parts have been given like numbers with respect to FIGS. 1 and 2. For example, in FIG. 3 there are two L-shaped position blocks 70 and 72 and one T-shaped position block 74 which are assembled so as to support two rows of a special part 76 which includes a cylindrical stem having a central bore and two annular flanges one at one end and one at approximately the middle of the cylindrical stem. In FIG. 4 there are four oblique position blocks 80, 82, 84 and 86 each of which has an oblique surface 88, 90, 92 and 94. When used in pairs as shown these oblique position blocks may be used to support triangular work pieces 96 for machining. With this assembly of oblique position blocks a keeper plate 98, shown in phantom, may be used at each end of each pair of such blocks to ensure that the special work pieces 96 can not be driven out either end of the trough formed by the mating oblique surfaces 88, 90 and 92, 94.

Figure 5:
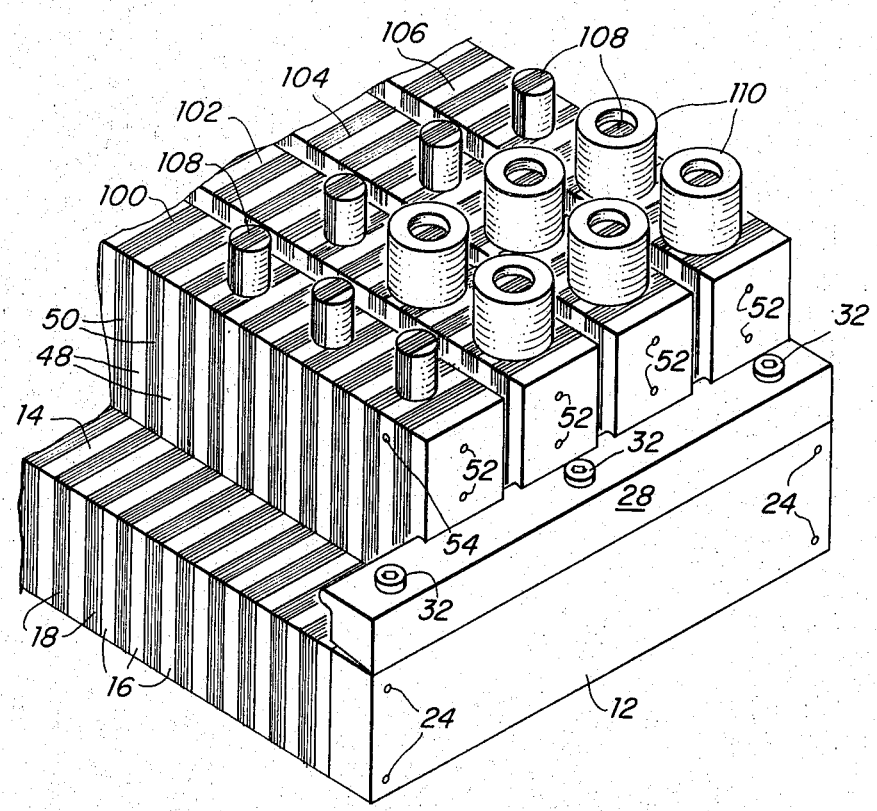
FIG. 5 is an axonometric view of a portion of the work holder of FIG. 1 with four position blocks clamped on the work surface, each position block including a plurality of pegs mounted in spaced relation on its top surface for positioning a number of special work pieces to be machined.
Figure 6:
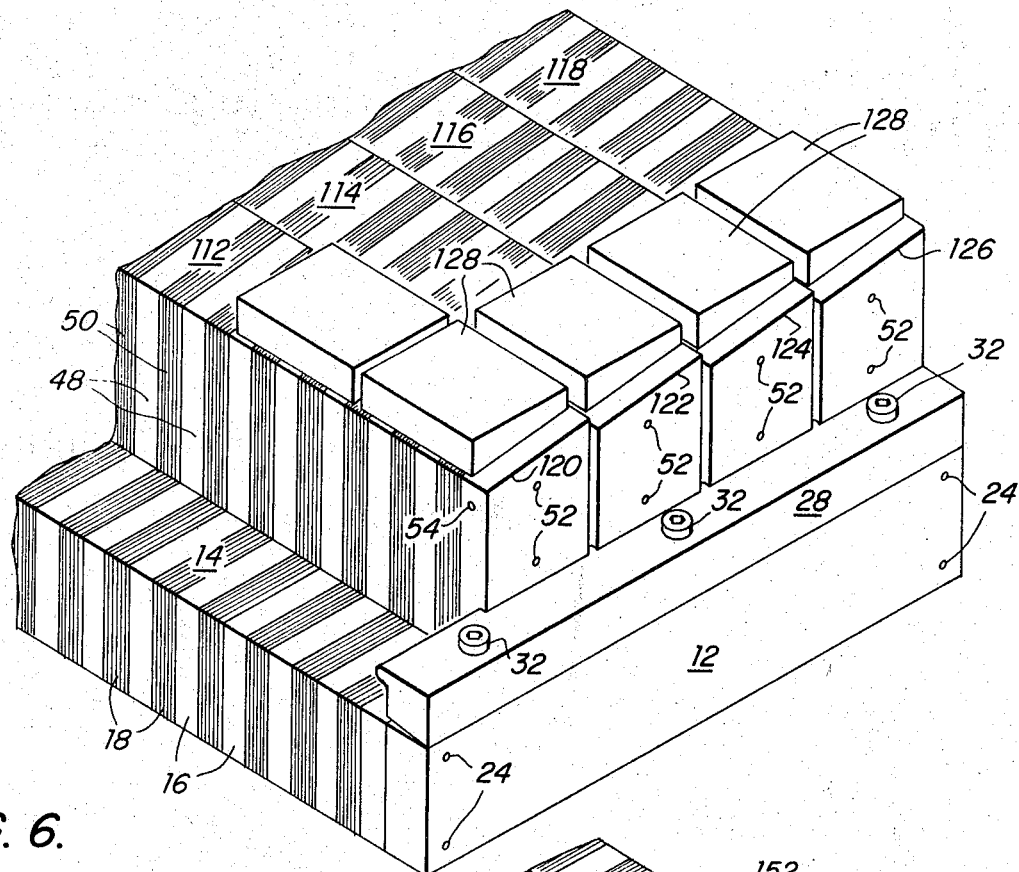
FIG. 6 is an axonometric view of a portion of the work holder of FIG. 1 showing four position blocks having inclined top surfaces clamped in position on the work surface for positioning a number of special work pieces to be machined.
Figure 7:
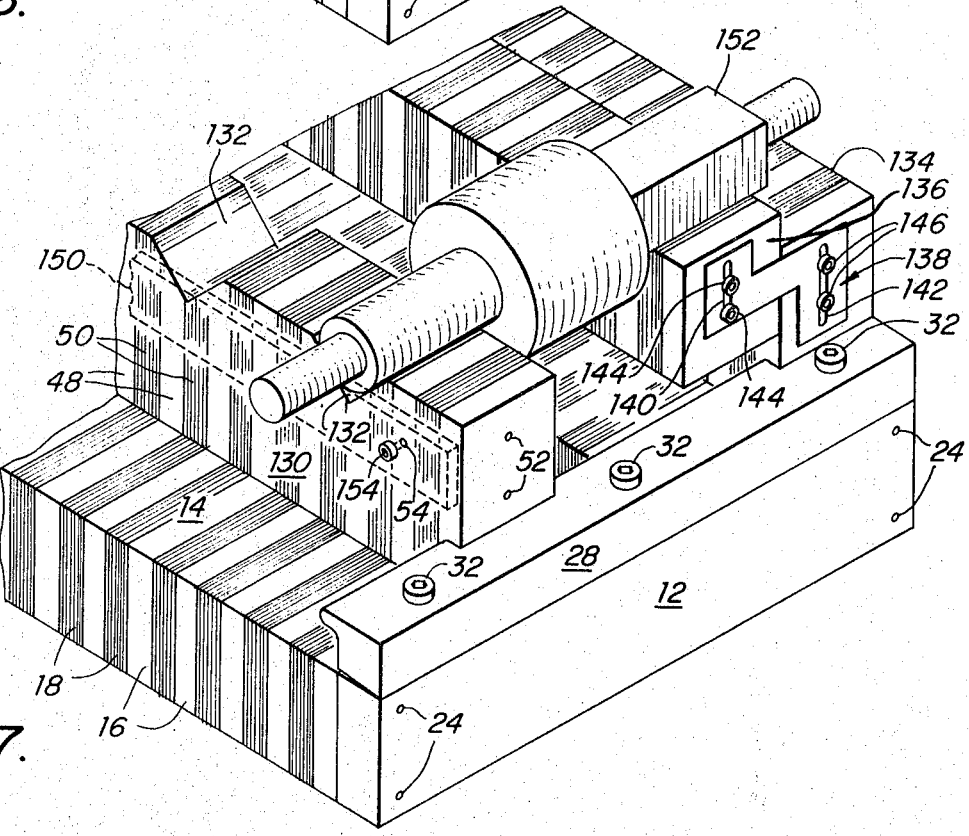
FIG. 7 is an axonometric view of a portion of the work holder shown in FIG. 1 having clamped in position on its work surface a position block with transverse V-grooves and a pair of position blocks held in stacked array for positioning a number of special work pieces to be machined.

In FIG. 5 there is shown four position blocks 100, 102, 104 and 106 each of which has a plurality of vertical studs 108 extending from its upper surface for supporting special work pieces 110 which are cylindrical pieces having a central bore which fits snugly over studs 108. In FIG. 6 there is shown four position blocks 112, 114, 116 and 118 whose top surfaces 120, 122, 124 and 126 are inclined to receive wedge shaped special work pieces 128. A keeper plate, such as keeper plate 98 shown in FIG. 4, may be used to advantage here as well. In FIG. 7 there is shown a work holder similiar to that in FIG. 1 including a position block 130 which includes a plurality of transverse V-grooves 132 and a pair of rectangular position blocks 134, 136 arranged in stepped array by means of assembly bracket 138; assembly bracket 138 contains two slots 140 and 142 for receiving screws 144 and 146 which engage in holes 52 in the ends of position blocks 134 and 136. A second assembly bracket 138 with a second set of screws 144 and 146 is used at the other end of position blocks 134 and 136. A keeper plate 150, shown in phantom, may be used to prevent transverse motion of special work piece 152 in transverse V-slots 132 and is fastened to the plates by means of screws 154 which engage in threaded holes 54.

The basic work holder 10, FIG. 1, may be used as the basis for a more expanded work holder unit 160, shown in FIG. 8, where like parts have been given like numbers and similar parts like numbers primed. In FIG. 8 anchor blocks 20' and 22' are similar to anchor blocks 20 and 22 except that they are somewhat longer and extend down well beyond work surface 14. The added volume beneath work surface 14 between extended anchor blocks 20' and 22' is further enclosed by front non-magnetic panel 162 and a rear non-magnetic panel 164 not visible in FIG. 8 but shown in FIG. 9. Anchor blocks 20' and 22' are mounted on a non-magnetic separator plate 166 which may be made out of any non-magnetic material such as aluminum or brass and which in turn is fastened by means of screws 168 and 170 to a magnetic mounting plate 172 which serves to mount the unit 160 to the work bed of the machine tool either by bolts which engage in slots 174 and 176 or by means of the magnetic field of the machine which may be used to grip the magnetic mounting plate 172.

Within the added space beneath work surface 14 there is located a means for providing a magnetic field for providing the holding power to the position blocks for securing work pieces which are located on work surface 14. This means for providing a magnetic field may be an electromagnetic coil or may be a permanent magnet structure such as will be described hereinafter. The space beneath work surface 14 may better be seen with reference to FIG. 9 which is an axonometric view looking into the space beneath the work surface 14. There it is shown that magnetic strips 16 extend downwardly well beyond the extent of non-magnetic strips 18 so that spaces 180 are formed between adjacent pairs of magnetic strips 16. The non-magnetic strips 18 extend downwardly to a point just below the top of non-magnetic panels 162 and 164 while magnetic strips 16 extend downwardly for a substantial distance beyond the tops of those panels.

In this embodiment the means of producing a magnetic field uses permanent magnets, and more specifically as shown in FIG. 10 a permanent magnet array 182 which includes a plurality of magnet members 184 arranged in spaced relation on a platform 186. Spacing between magnetic members 184 is such that array 182 may be made to nest completely in the bottom or work surface 14, FIG. 9 so that magnetic members 184 fill slots 180 between magnetic strips 16 and contact the bottom of non-magnetic strips 18. When in this fully nested position the magnetic field passes from the magnetic members 184 through the magnetic strips 16 and upwardly to engage position blocks and work pieces on work surface 14. To de-energize the magnetic field magnetic array 182 is retracted so that magnetic members 184 are removed from their nested position in slots 180. This is accomplished in one embodiment, FIG. 10, by means of a pair of curved bars 188 and 190 fastened to the bottom of platform 186. Bars 188 and 190 function as camming surfaces for the cranks 192 and 194 fashioned on shaft 196 which is journaled in bore 198 in anchor block 20' and passes through a bore 200 in anchor block 22'. When shaft 196 is rotated so that cranks 192 and 194 are fully extended against bars 188 and 190 array 182 will be fully retracted and when shaft 196 is rotated to 180 degrees from that position cranks 192 and 194 will bear on the bottom of platform 186 and fully nest array 182 in the bottom of work surface 14. A handle, 202, FIG. 8, may be fastened to the end of shaft 196 external to anchor block 22'.

Each magnet member 184 may be formed with a permanent magnet 204, FIG. 11, at its center and a non-magnetic insulating layer 206 extending about four sides to confine the magnetic field produced by magnet 204 in a desired path.

Other embodiments will occur to those skilled in the art and are within the following claims:

1. A magnetic work holder system including a work holder base adapted to hold a plurality of position blocks for positioning one or more work pieces and having a laminated work surface formed of alternately arranged magnetic and non-magnetic strips, comprising first and second clamp members disposed at opposite sides of said work surface, each of said position blocks having a recess at each end, each of said clamp members having a salient portion on its inner edge for engaging said recess in one or more position blocks disposed between them on said work surface, each of said clamp members including means for tightening a said clamp member toward said work holder base and means, cooperating with a said clamp member, for rotating said salient portion inwardly and downwardly to secure said position blocks, said magnetic strips on said work surface extending farther down that said non-magnetic strips and providing a plurality of spaces between the extended said magnetic strips; and means for providing a magnetic field including an array of magnet members spaced apart by the thickness of a non-magnetic strip, said array being nestable in the underside of the work surface with its magnet members between the magnetic strips and proximate the underside of said non-magnetic strips.

2. The magnetic work holder system of claim 1 in which each of said magnet members is located in a non-magnetic strip with a magnetic insulator layer covering the four of its six sides not including the two surfaces which interface with the magnetic strips on either side of said magnetic member.

3. The magnetic work holder system of claim 1 including mechanical actuator means for moving said array of magnet members toward and away from said work surface.

* * * * *